Aug. 4, 1936.  H. S. EBERHARD  2,049,693
TRACK ROLLER GUARD
Filed Sept. 14, 1935  2 Sheets-Sheet 1

INVENTOR
HARMON S. EBERHARD
BY Charles M. Fryer
ATTORNEY

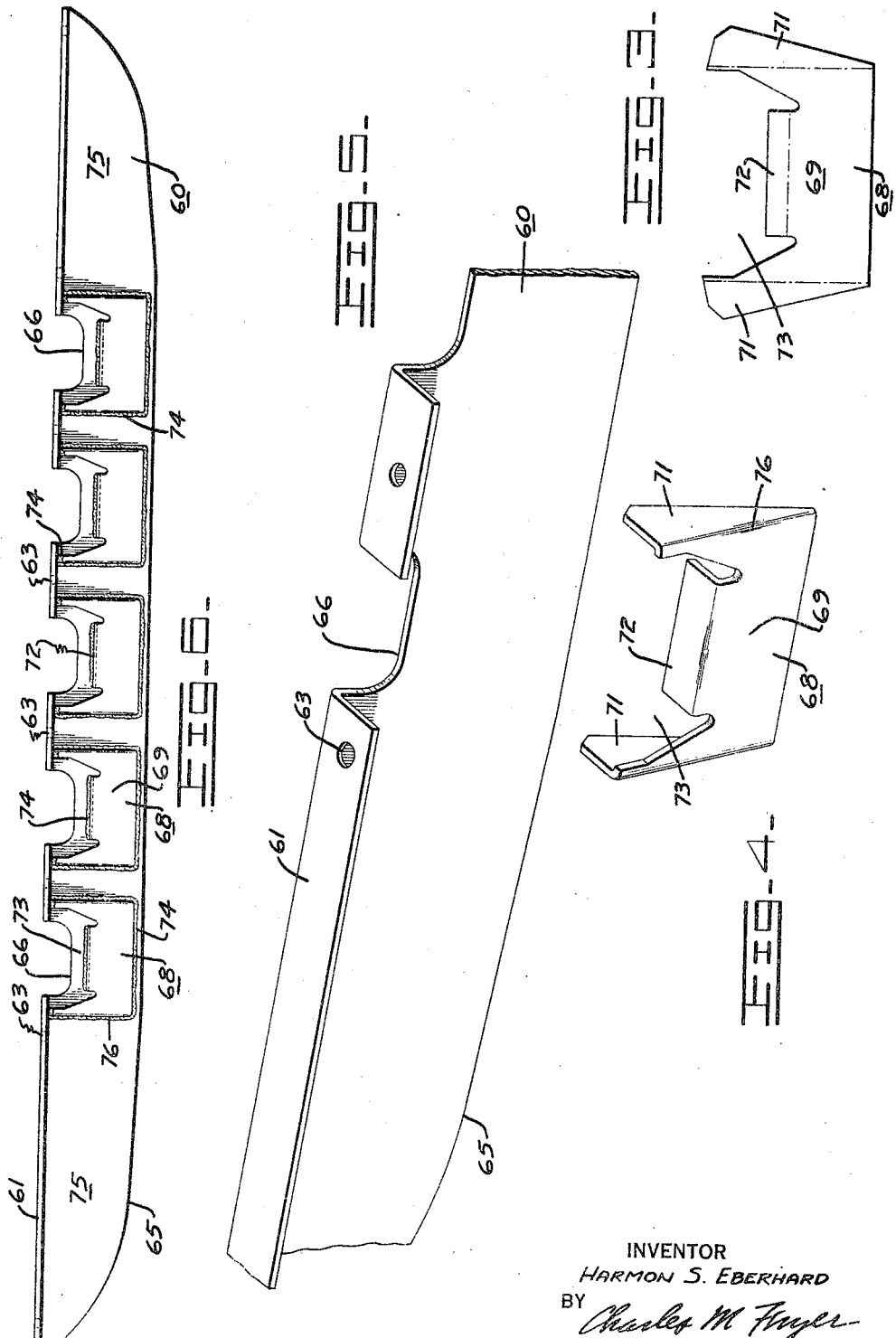

Patented Aug. 4, 1936

2,049,693

UNITED STATES PATENT OFFICE 2,049,693

TRACK ROLLER GUARD

Harmon S. Eberhard, Peoria, Ill., assignor to Caterpillar Tractor Co., San Leandro, Calif., a corporation of California Application September 14, 1935, Serial No. 40,523

10 Claims. (Cl. 305—9)

The present invention relates to a guard for protecting the track roller mechanism of a track-type tractor and particularly to a guard member for protecting such mechanism under extremely trying conditions such as where such mechanism is apt to receive severe blows from rocks, stumps, or the like.

The conventional type of guard to protect the track roller mechanism of track-type tractors, is effective under ordinary conditions of use, and also serves to prevent dirt and débris from getting onto the inside surface of the endless track. This guard merely comprises a comparatively light and thin substantially flat rolled metal member in sheet form, i. e., comparatively thin plate, or sheet metal, and which is adapted to fit along either side of the track rollers and has openings or apertures therein for receiving the ends of the track roller shafts, thus allowing access to the track roller grease fittings which protrude beyond the guard. Guards of this type are shown in the patents to Eberhard, 1,945,185 and Koop, 1,992,702. Such substantially flat plate or sheet is subject to disadvantages. During certain operating conditions, such as where the tractor is working in quarries or in heavy timber, rocks or heavy branches are often thrust between the track links and the inside of the flat guard, and forced against the guard thereby bending it or denting it so that it may be rendered ineffective, particularly adjacent the apertures where the structure is weakest. Also, stumps or boulders or the like may crash against the outside of the guard causing similar denting or bending, or damage to the protruding track roller shafts and grease fittings cooperating therewith. In order to avoid these disadvantages, track guards have been formed of heavy cast steel to provide a stronger construction. However, casting this entire guard unit has been found to be expensive, to add undue weight to the tractor, and not entirely satisfactory for the heavy usage to which it is intended.

My invention seeks to overcome these problems, and, therefore, has as its objects among others, the provision of an improved:

(1) Comparatively light weight track roller guard which is of strong construction, and which can be economically manufactured;

(2) Comparatively light weight track roller guard having reenforcing or stiffening means for minimizing bending or denting of the guard;

(3) Track roller guard having deflecting means for protecting the ends of the track roller shafts and the grease fittings connected thereto, and at the same time allow ready access to such fittings;

(4) Stiffening and deflecting member which can be readily secured to a conventional sheet form of rolled metal guard base, to provide a strong and economical guard unit;

(5) Stiffening means which will reenforce the structure adjacent the grease fitting aperture of a sheet form of guard base.

Referring to the drawings:

Fig. 3 is an elevational view illustrating the flat blank for one of the stiffening or deflecting members before it is formed.

Fig. 4 is a perspective view of one of the stiffening or deflecting members after forming thereof, but before it is secured to a substantially flat metal base of the guard.

Fig. 5 is a fragmentary view showing the base of the guard prior to securing thereto of the stiffening member of Fig. 4.

Fig. 6 is an outside elevational view of the complete track roller guard before it is mounted on a tractor.

Generally, the invention comprises a guard base of substantially flat sheet or plate metal (metal in sheet form), and which is, consequently, of comparatively light and economical construction, to which are secured stiffening or reenforcing means formed of similar metal; so as to provide a completed guard unit capable of efficient performance under trying conditions and which is of economical construction.

Figure 1:
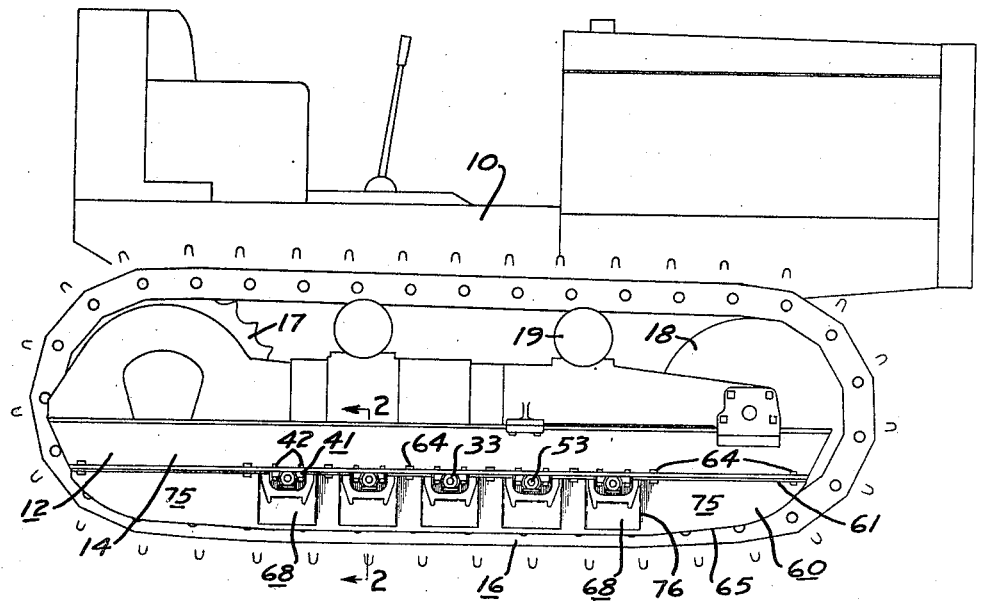
Fig. 1 is a schematic side elevation showing a track-type tractor embodying the track roller guard of my invention.
Figure 2:
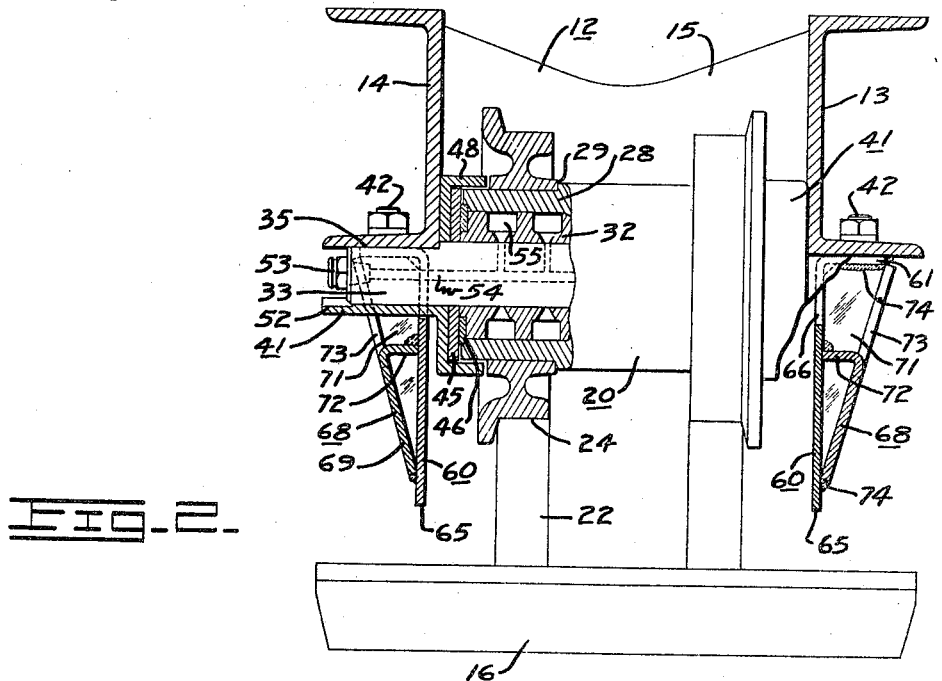
Fig. 2 is a sectional view along line 2—2 of Fig. 1.

Referring specifically to the disclosure of the drawings, Fig. 1 shows a track-type tractor upon which the track roller guard embodying the invention is adapted to be mounted. The tractor includes a tractor body 10 supported by track roller or truck frames 12, one of which is provided at each side of the body 10. Each track frame 12 consists of an inner channel 13 and an outer channel 14 held together by suitable cross braces 15. Associated with each of the track frames 12 is an endless track 16 engaging final drive sprocket wheel 17 and front idler wheel 18. Supporting the upper run of the endless track are track rollers 19; and mounted adjacent channels 13 and 14 and engaging the lower run of the endless track 16, are a plurality of track rollers 20. Endless track 16 is formed of a plurality of track links 22 having suitable track shoes secured thereto. The links 22 are adapted to engage flanges 24 on track rollers 20 as shown in Fig. 2.

Rims or flanges 24 of track rollers 20 are usually formed as separate drop forgings, and are shrunk on a hub 28 against shoulders 29. Hub 28 is supported by bushings 32 journaled for rotation on shaft 33 which is formed with a flat 35 at each end thereof and held against the underside of channels 13 and 14 by brackets 41, secured to channels 13 and 14 by suitable fastening means 42. In order to take care of end thrust, bracket 41 has adjacent bushing 32, a thrust washer 45 which engages a washer 46 mounted on the bushing 32. Bracket 41 is also formed with shroud portion 48 which effectively encloses the thrust washers to protect them from deleterious foreign matter. Shaft 33 protrudes for some distance under the channels, and is provided at its outer end with a grease fitting 53. Extending from the grease fitting 53 is a drilled passage 54 which serves to convey lubricant to suitable reservoir spaces 55 in the bushing 32. Adjacent the outer end of shaft 33, bracket 41 is formed with a lip 52 to form a protection for grease fitting 53 against débris encountered by the tractor during its ordinary conditions of operation.

In order to protect the track rollers 20 against damage during ordinary conditions of operation and to prevent débris from getting onto the upper surface of the under reach of the endless track, I provide a guard at each side of track frame 12 and adjacent the track rollers 20. Such guard comprises a substantially flat, sheet form guard plate or base 60, such as shown fragmentarily in Fig. 5. Each guard plate or base 60 is formed with horizontal, bent-over flange 61 which is provided with apertures 63 adapted to match with similar apertures formed in the under flanges of channels 13 and 14, so as to provide for securing of the guard by suitable fastening means 64. The lower edge 65 of the guard is ordinarily formed to fit the contour of the lower run of endless track 16. Intermediate the ends of the guard base 60 and at spaced points along the upper edge thereof, cut-away portions 66 are formed, to provide apertures for receiving the ends of track roller shafts 33 and the grease fittings 53 when the guard is assembled on the track frame 12, so as to enable ready access to such shafts and fittings.

The guard base thus far described has been heretofore employed as a conventional unit to protect the track rollers 20. However, although this guard base alone may be satisfactory under ordinary conditions to prevent damage to the track roller mechanism, there exist trying conditions when the tractor is employed in rough work, such as logging or mining work, during which the guard is of insufficient strength to withstand the rough usage; particularly adjacent grease fitting apertures or openings 66 where the structure is weakest.

With the present invention, reenforcing and stiffening means of economical construction, is secured to the base 60 to enable such base to be used under the trying circumstances pointed out. Thus, a strong reenforced guard unit composed essentially of sheet form of metal, making for economy of manufacture, can be employed, instead of more costly cast metal guards heretofore used for heavy duty work. At the same time, further economy of manufacture obtains because my invention enables the use of the base element 60 which, as was previously explained, is of conventional construction, and therefore need not be specially manufactured.

As can be seen more clearly from Figs. 3 and 4, the reenforcing means comprises metal member 68 of sheet form, formed from a one-piece stamping provided with a main central portion 69 and end wing portions 71 of substantially triangular shape; the stamping being adapted to be bent along the dotted lines shown in Fig. 3 to form the structure illustrated in Fig. 4. Upon bending along these lines, wing portions 71 are positioned at right angles to central portion 69; and a horizontal lip or flange 72 is formed substantially normal to central portion 69, having recess 73 to permit access to the grease fitting as can be seen in Fig. 2. A reenforcing member 68 is secured by welding 74, to substantially flat base 60 adjacent each of apertures or recesses 66 therein, with the recess 73 in the member cooperating with the recess 66 in the base. Also, if desired, similar reenforcing means (not shown) may be secured to the end portions 75 of the guard base 60 beyond end openings 66, especially if these end portions are of substantial length. The welding 74 extends along the inner edges of end wings 71, the upper edges of wings 71 which are secured to the under surface of horizontal flange 61 of the base 60, the inner edge of flange 72, and the lower edge of central portion 69.

By virtue of the triangular shape of end wings 71 with an apex of the triangle at the lower end, it will be noted that the central portion 69 of each reenforcing member 68 is positioned to slant upwardly from its lower end to a position adjacent grease fitting 53, to thus provide a side deflecting means or wall to minimize damage to the grease fitting and shaft 33 by upwardly flying objects caused by travel of the tractor. Rounded deflecting corners 76 also obtain, by virtue of the bending of wings 71 and flange 72.

Because both wing or flange portions 71 and horizontal flange 72 are substantially normal to both the side of base 60 and to central portion 69 of the reenforcing member, and flange 72 normal to flanges 71, stiffening ribs obtain to preclude warping or twisting of the guard, or bending thereof which might otherwise be caused by heavy objects striking the guard. Also, the ribs, which flanges 71 and 72 form, provide a hollow or box construction, thereby resulting in an extremely stiff but light reenforcing structure.

By the provision of the guard of my invention, it will be seen that rocks and branches coming between base 60 and the endless track, will not be able to force the guard outwardly because of the strength provided by the stiffening members 68; particularly adjacent the lower portion of guard where the space defined by flange 72, the deflecting face or central portion 69, the end wings or flanges 71, and the side of the base form a tubular box construction. In the same manner, branches and rocks hitting against the deflecting face 69, will not tend to push the guard 60 inwardly against the endless track because of the strength of the tubular construction. Furthermore, the deflecting corners 76 serve to protect the ends of the track roller shafts and the grease fitings associated therewith, from blows which may be directed diagonally toward those member during progress of the tractor; and the weakest portions of the sheet form of metal guard base, adjacent grease fitting openings 66, are adequately reenforced.

I, therefore, claim as my invention:

1. A guard for protecting track mechanism of a track-type tractor, comprising a metal base of sheet form to be secured to a track frame of the tractor, and means for reenforcing said base comprising a reenforcing member having stiffening flanges substantially normal with respect to a side of said base and secured thereto.

2. A guard for protecting track mechanism of a track-type tractor, comprising a base to be secured to a track frame of the tractor and having an opening for receiving a protruding part of the track mechanism, and a reenforcing member secured to a side face of said base adjacent said opening and having an object deflecting portion for protecting said part.

3. A guard for protecting track mechanism of a track-type tractor, comprising a metal base of sheet form to be secured to a track frame of the tractor and having an opening for receiving a protruding part of the track mechanism, and a metal reenforcing member of sheet form secured to said base adjacent said opening; said reenforcing member having an opening to allow access to said part, stiffening flanges substantially normal with respect to a side of said base and secured thereto, and an upwardly sloping object deflecting portion for protecting said part.

4. A guard for protecting track mechanism of a track-type tractor, comprising a metal base of sheet form to be secured to a track frame of the tractor and having a substantially flat planar side portion and an opening for receiving a protruding part of the track mechanism, and a metal reenforcing member of sheet form secured to said base adjacent said opening; said reenforcing member having a substantially flat central portion, substantially triangularly shaped end flanges normal to said central portion and secured to the planar side portion of the base, a horizontal flange between said end flanges and secured to the planar side portion of the base, and an opening above said horizontal flange to allow access to said protruding part.

5. A guard for protecting track mechanism of a track-type tractor, comprising a substantially flat member to be secured to a track frame of the tractor, and reenforcing means welded to said flat member and shaped to provide with said flat member a substantially hollow stiffening structure.

6. A reenforcing attachment for a guard base for protecting track mechanism of a track-type tractor, comprising a member formed to provide with said base a substantially hollow stiffening structure.

7. A reenforcing attachment for a guard base for protecting track mechanism of a track-type tractor, comprising a member formed to provide with said base a substantially hollow stiffening structure of substantially triangular cross section.

8. A reinforcing attachment for a guard base for protecting track mechanism of a track-type tractor, comprising a member having a substantially flat intermediate portion, substantially triangularly shaped wing portions substantially normal to said intermediate portion, a flange between said wing portions and substantially normal with respect thereto and with respect to said intermediate portion, and an opening above said flange.

9. A guard for protecting track mechanism of a track-type tractor, comprising a metal base of sheet form to be secured to a track frame of the tractor and having an opening for receiving a protruding part of the track mechanism, and means for reenforcing said base adjacent said opening comprising a stiffening member secured to a side of said base adjacent said opening and shaped to cooperate with said side to provide a substantially hollow stiffening structure.

10. A guard for protecting track mechanism of a track-type tractor comprising a substantially flat metal base of sheet form to be secured to a track frame of the tractor, and means for reenforcing said base comprising a stiffening member secured to a side of said base and shaped to provide with said side a hollow stiffening structure.

HARMON S. EBERHARD.